United States Patent
Chopinez et al.

(10) Patent No.: US 10,343,323 B2
(45) Date of Patent: Jul. 9, 2019

(54) METHOD FOR PROCESSING POLYETHYLENE TEREPHTHALATE

(71) Applicant: NESTEC S.A., Vevey (CH)

(72) Inventors: Jean-Marc Chopinez, Vittel (FR); Jean-Francois Briois, Vittel (FR)

(73) Assignee: Nestec S.A., Vevey (CH)

( * ) Notice: Subject to any disclaimer, the term of this patent is extended or adjusted under 35 U.S.C. 154(b) by 242 days.

(21) Appl. No.: 15/324,933

(22) PCT Filed: Jul. 9, 2015

(86) PCT No.: PCT/EP2015/065691
§ 371 (c)(1),
(2) Date: Jan. 9, 2017

(87) PCT Pub. No.: WO2016/005493
PCT Pub. Date: Jan. 14, 2016

(65) Prior Publication Data
US 2017/0210050 A1 Jul. 27, 2017

(30) Foreign Application Priority Data
Jul. 10, 2014 (EP) .................................... 14176604

(51) Int. Cl.
*B29C 49/00* (2006.01)
*B29C 49/06* (2006.01)
(Continued)

(52) U.S. Cl.
CPC ........ *B29C 49/0005* (2013.01); *B29B 13/065* (2013.01); *B29C 45/0001* (2013.01);
(Continued)

(58) Field of Classification Search
None
See application file for complete search history.

(56) References Cited

U.S. PATENT DOCUMENTS 3,400,468 A * 9/1968 Matthews ............. F26B 17/122
34/560
4,354,317 A * 10/1982 Mathis ...................... F26B 1/00
34/129

(Continued)

FOREIGN PATENT DOCUMENTS

CN 100999264 A 7/2007
DE 10140370 3/2003

(Continued)

OTHER PUBLICATIONS

Translation of Schepper et al, "Pre-Drying is Essential, Plastic Practice Series Part 10, Injection Molding of Polyesters", Plastverarbeiter, vol. 54, Issue 11, pp. 78-80 dated 2003. Translated by LinguaLinx Solutions, Inc. (Year: 2003).*

(Continued)

*Primary Examiner* — Robert B Davis
(74) *Attorney, Agent, or Firm* — K&L Gates LLP (57) ABSTRACT

The inventions relates to a method for processing polyethylene terephthalate (PET) comprising supplying PET raw material (S1), drying the PET raw material (S4) to a target moisture level, plasticizing the PET (S5), and injecting the plasticized PET (S6) into a mold. In this method, the target moisture level is between 60 ppm and 250 ppm to generate hydrolysis of PET during plasticization (S5) resulting in a controlled drop of intrinsic viscosity of the PET. According to other aspects of the invention, there is provided a method for forming a bottle and a method for packaging still beverage in this bottle.

11 Claims, 5 Drawing Sheets

(51) Int. Cl.
*B29B 13/06* (2006.01)
*B29C 45/00* (2006.01)
*B29C 49/42* (2006.01)
*B29K 67/00* (2006.01)
*B29L 31/00* (2006.01)

(52) U.S. Cl.
CPC .......... *B29C 49/06* (2013.01); *B29C 49/4252* (2013.01); *B29C 49/4273* (2013.01); *B29K 2067/003* (2013.01); *B29L 2031/7158* (2013.01)

(56) References Cited

U.S. PATENT DOCUMENTS

| | | | |
|---|---|---|---|
| 6,655,043 B1* | 12/2003 | Kingery | F26B 25/22 34/364 |
| 2010/0300043 A1* | 12/2010 | Thomasset | B29C 49/64 53/425 |

FOREIGN PATENT DOCUMENTS

| | | |
|---|---|---|
| DE | 102005004533 A1 | 8/2006 |
| EP | 0502391 | 9/1992 |
| JP | 2001079917 | 3/2011 |
| WO | 0121373 | 3/2001 |

OTHER PUBLICATIONS

Schepper et al. "Vortrocknen muss sein" Plastverabeiter, 2003, vol. 54, No. 11, 2 pages, XP002729975.

Article entitled "PET bottle recycling" Wikipedia, Feb. 16, 2014, retrieved from the Internet at http://en.wikipedia.org/wiki/PET_bottle_recycling, on Sep. 5, 2014, 5 pages, XP002729976.

Article entitled "Polyethylene terephthalate" Wikipedia, Jun. 14, 2014, retrieved from the Internet at http://en.wikipedia.org/wiki/Polyethylene_terephthalate, on Sep. 5, 2014, 18 pages, XP002729977.

Article entitled "Drying Relpet" Reliance Industries Limited, Apr. 17, 2003, retrieved from the Internet at http://www.ril.com/cmshtml/drying.pdf, on Sep. 19, 2014, 5 pages, XP002729978.

Chinese Office Action for corresponding Chinese Application No. 201580037085.3 dated Aug. 17, 2018, (9 pages).

* cited by examiner

METHOD FOR PROCESSING POLYETHYLENE TEREPHTHALATE

CROSS REFERENCE TO RELATED APPLICATIONS

The present application is a National Stage of International Application No. PCT/EP2015/065691, filed on Jul. 9, 2015, which claims priority to European Patent Application No. 14176604.8, filed Jul. 10, 2014, the entire contents of which are being incorporated herein by reference.

TECHNICAL FIELD

The invention relates to PET (polyethylene terephthalate) processing.

It relates to the processing of PET between its supply in raw form, e.g. PET chips, and its molding to form a preform or a container such as a bottle. It focuses on the processing steps before PET molding, and more particularly on a process for drying PET.

BACKGROUND OF THE INVENTION

PET is a thermoplastic polymer resin of the polyester family and is commonly used in beverage, food and other liquid containers. To form a container such as a bottle, one or two-step molding methods may be used. For example, in a two-step method a preform is injection-molded. Next, on a second machine, the preform is inflated into its final shape using stretch blow molding.

PET is commonly supplied in the form of PET chips or flakes. The PET chip material is brought to a high temperature to be molded. An extruder provides the melted PET material to a preform mold.

However, in the solid form such as PET chips PET has a high hygroscopic behavior. PET chips absorb moisture from the atmosphere until equilibrium is achieved. The PET chips supplied for processing are water-saturated, and may contain up to 0.6% water by weight. During plasticizing in the extruder, the presence of moisture breaks polymer chains. Any water present at this stage rapidly hydrolyses the polymer, thereby reducing its molecular weight and damaging its physical properties.

More particularly, breaking polymer chains of PET results in a drop in IV (intrinsic viscosity) of the PET. The intrinsic viscosity is commonly used to characterize PET material. It is a measure of the polymer molecular weight. The longer the polymer chains and the more entanglements between chains the higher the viscosity. A drop in IV may result in defects in the molded preform or container, such as growth of bubbles, streaks, or a hazy appearance. In addition, degradation through hydrolysis of PET may cause acetaldehyde, benzene, and/or formaldehyde generation. Typically, acetaldehyde can cause an off-taste in bottled water: that is why its generation must be avoided.

According to commonly accepted good practice in PET molding, PET has to be dried to very low moisture content before molding. Indeed, the moisture content is reduced to a maximum of 0.005% (50 ppm) by weight, and preferably about 0.003% (30 ppm).

Drying is performed in a PET dryer. Typical PET dryers use a closed loop in which hot and dry air circulates. PET chips or flakes are placed in a hopper, and hot dry air flows onto the material, from which it absorbs moisture. The air is next conducted into a drying unit where it is cooled and de-humidified. De-humidifying is carried out using a desiccant bed (generally in a desiccation tower) that must be periodically regenerated. De-humidified air is next heated again before being passed through the hopper again.

Three important parameters of the drying air are air temperature, air flow and air dew point. The residence time of the PET in the hopper (drying time) is a fourth important parameter in PET drying. Indeed, because of the hygroscopic behavior of PET, moisture is present inside the PET chips. Usually a residence time of about six hours at 180° C. and a dew point of −60° C. is necessary to bring the material to less than 50 ppm of water in weight.

In addition to the above detailed hydrolytic degradation, the PET may be degraded through oxidative degradation and thermal degradation. The drying temperature generally used is around 170° C., and should not exceed 190° C., also depending whether recycled PET (rPET) chips or flakes are used. The drying temperature is the temperature of air used for drying the PET, and also corresponds to the temperature of the PET at the hopper exit.

To obtain the required PET dryness, the air dew point (representing air dryness) should be around −60° C.

The drying parameters of PET chips must be carefully controlled according to strict and well established rules.

PET manufacturers sell PET in the form of chips or flakes. Customers' (e.g. container manufacturers') demand for PET having a high intrinsic viscosity (IV) has grown in the past years. PET having a high IV (hereafter "high-IV PET") has better mechanical properties, and bottles used to contain sparkling beverages have to be made of high-IV PET. Typical high-IV PET which is available on the market has an IV of 0.80 dL/g or above.

PET having a lower IV, typically between 0.72 dL/g and 0.76 dL/g, is sufficient for still beverage bottles, such as still water bottles. However, such PET which was formerly widely available on the market is now rare and expensive. This is because the demand for high IV PET is much greater than the demand for low-IV PET, and also because a significant quantity of recycled PET, which has a high IV, is commonly incorporated into the material of the PET flakes. However, low IV PET has some advantages over high IV PET. It is easier to inject for molding. It allows a better, more homogeneous, distribution in the mold in which it is injected. It allows manufacture of preforms having a wall thickness of less than 2 mm, which difficult if not is impossible with high-IV PET. A preform having a small wall thickness is needed to obtain a lightweight thin-walled bottle.

In addition, some industrial equipment used to inject preforms (or, more generally, to inject PET into a mold) is not compatible with high-IV PET. Indeed, injecting high IV PET requires a higher injection pressure, and/or a higher injection temperature than injecting a PET having a lower IV. Expensive low-IV PET has to be used in these industrial machines, or else they must be adapted to make possible the use of high IV-PET.

SUMMARY OF THE INVENTION

The applicant has found that the IV loss, which has to be avoided at all costs according to common practice, may be to some extent voluntarily generated and used advantageously.

According to a first aspect of the invention, there is provided a method for processing polyethylene terephthalate (PET) comprising:
supplying PET raw material;
drying the PET raw material to a target moisture level;

plasticizing the PET;
injecting the plasticized PET into a mold;
wherein the target moisture level is between 60 ppm and 250 ppm to generate a hydrolysis of PET during plasticization resulting in a controlled drop of intrinsic viscosity of the PET.

The drop of intrinsic viscosity obtained through hydrolysis of PET during plasticization results in an easier injection of a more fluid plasticized material. At the target moisture level, the drawbacks of hydrolytic degradation of PET (formation of acetaldehyde, loss of physical properties, etc.) are avoided or maintained at an acceptable level. Compared to a conventional PET processing method, injection molding may be performed at a lower temperature, and/or the molded part may be thinner or have a more constant thickness. Less energy is needed. Old or less powerful injection equipment may be used.

A particular embodiment of this method may comprise, before drying the PET raw material, determining the target moisture level based on the intrinsic viscosity of the supplied PET raw material and a targeted intrinsic viscosity of the PET after plasticization.

A typical targeted intrinsic viscosity may be set between 0.70 dL/g and 0.76 dL/g.

The supplied raw material may have for example an intrinsic viscosity comprised between 0.80 dL/g and 0.85 dL/g.

In such a method, drying may be performed at 150° C. or below. Drying may be performed using drying air having a dew point of −40° C. or higher and preferably about −30° C. Drying may be performed using a residence time of the PET raw material in a dryer comprised between one and four hours, and preferably between one and three hours.

In particular, the PET may be injection-molded to form a container preform. In such a case, the container is a bottle.

According to a second aspect of the invention, there is provided a method for forming a bottle comprising using a method as previously described to provide a preform of a bottle, and obtaining the bottle using blow molding.

The obtained bottle may have a wall thickness of less than 100 microns over at least 50 percent of its surface.

The invention also relates to a method of packaging a still beverage comprising using a method to provide a bottle according to the above-described second aspect of the invention, and next filling said bottle with a beverage.

DEFINITIONS

As used herein, the term "intrinsic viscosity" (IV), expressed in dL/g, is a measure of the average molecular weight of the polymer. Indeed, in polymer chemistry intrinsic viscosity is related to molar mass through the Mark-Houwink equation. It denotes the average length of a molecular chain. The intrinsic viscosity is the limit of the specific viscosity when the concentration of dissolved polymer approaches zero, the specific viscosity being:

$$\eta_{sp} = \frac{\eta_0 - \eta}{\eta}$$

where $\eta$ is the solvent viscosity in the absence of dissolved polymer and $\eta_0$ is the viscosity of the solution.

As used herein, "dew point" refers to the temperature at which water vapor from the air begins to form droplets and condenses on surfaces that are colder than the dew-point of the air. It is expressed in ° F. or ° C. The dryness of air may be expressed in dew point. The lower the dew point, the higher is the dryness of the air.

As used herein, "relative humidity", "moisture content", or "moisture level" of the PET is the ratio of the weight of water contained in the PET material to the weight of said PET material. It is expressed in percentage or in part per million (ppm).

As used herein, the term "residence time" refers to the time during which hot air is sent into the hopper to remove moisture from the dried material.

As used herein, the term "air temperature" refers to the temperature of the air introduced in the hopper for material drying. Air temperature is a fundamental drying parameter for all polymers. Hygroscopic materials such as polymers have a strong attraction for water, so that the water molecules are bound to the material and the forces that bind the water molecules to the polymer chains are weakened above a certain temperature. Air temperature may be expressed in ° C. or ° F.

As used herein, the term "crystallinity" refers to the degree of structural order in a solid, e.g. a polymer such has PET. The degree of crystallinity has a big influence on hardness, density, transparency and diffusion.

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

As used in this specification, the words "comprises", "comprising", and similar words, are not to be interpreted in an exclusive or exhaustive sense. In other words, they are intended to mean "including, but not limited to".

The invention is further described with reference to the following examples. It will be appreciated that the invention as claimed is not intended to be limited in any way by these examples.

Figure 1:
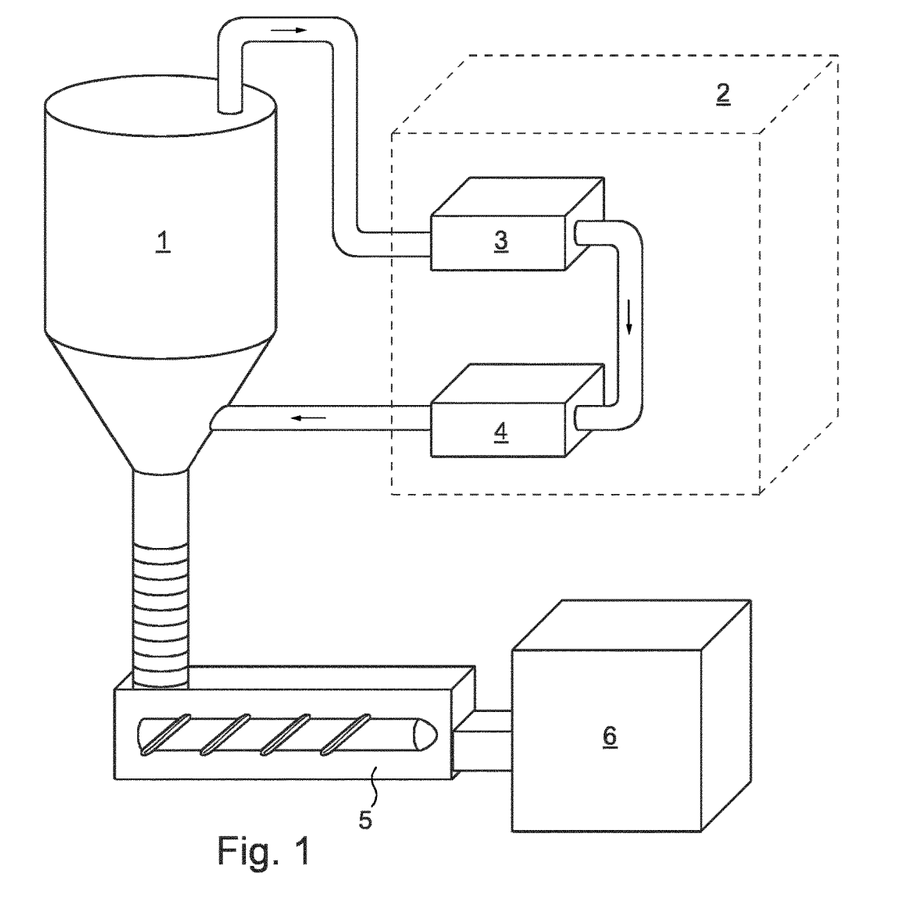
FIG. 1 is a schematic representation of a PET processing line.

FIG. 1 is a schematic representation of a PET processing line. PET is supplied in the form of PET chips or flakes. The PET chips are introduced into a hopper 1, where they are dried. The PET dryer comprises said hopper 1 and a drying unit 2. The drying unit comprises means 3 configured to cool and de-humidify air which is extracted from the hopper 1. Said means 3 may comprise a desiccation tower. The dryers typically have two desiccant-filled towers with switching valves that direct the air flow to one of the two towers: while one of the towers is drying the air the other is in a regeneration mode in which the collected moisture is flushed to the ambient air. An air heater 4 is configured to bring the de-humidified air to high temperature. The hot and dry air next returns in the hopper 1, where it takes water contained in the PET chips.

A closed-loop of air is thus formed in the PET dryer.

After having been dried for several hours, the hopper 1 is opened and PET reaches an extruder 5. Plasticization of the PET happens in the extruder. The plasticized material is next introduced into a mold 6 where it takes the desired form. The PET is cooled and returns to a solid state in the mold 6.

This process is in particular used to obtain preforms of PET containers such as bottles. A so obtained preform is next blow molded to take its final shape (e.g. the shape of a bottle, a thin-walled container, etc.).

Figure 2:
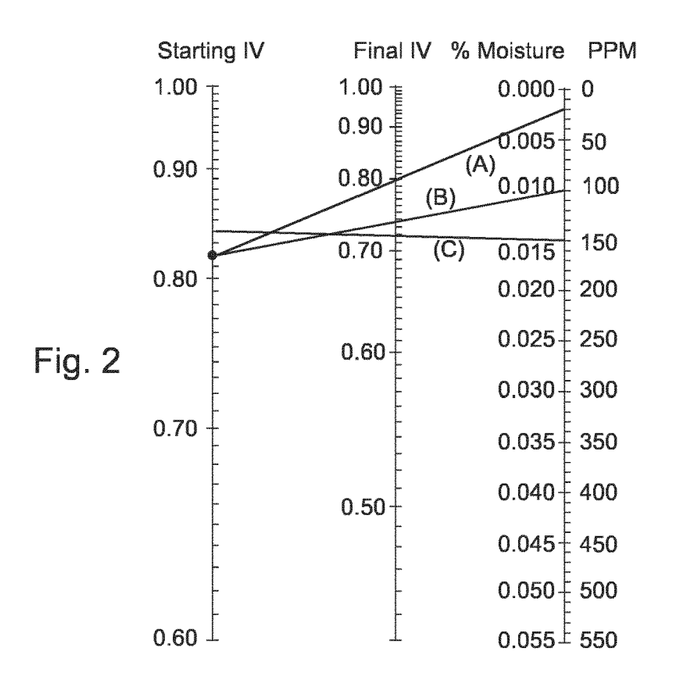
FIG. 2 is a nomograph representing the relation between IV of PET before drying and injection molding and IV of PET after such processing, depending on PET moisture content after drying.

FIG. 2 is a nomograph (also called nomogram, alignment chart or abaque) representing the relation between IV of PET before drying and injection molding and IV of PET after drying and plasticization, depending on the moisture content of PET after drying. This chart, which represents well known information in a convenient manner, has been established by Plastic Technologies, Inc. (PTI®).

This chart comprises three vertical scales. The left scale represents the IV of PET before processing, i.e. the IV (in dL/g) of the PET constituting the PET chips as provided from the PET manufacturer. The center scale represents the IV (in dL/g) of PET after plasticization in the extruder, which is also the final IV of the molded PET. The right scale represents the moisture content of PET after drying, expressed in weight percentage.

This chart is read by drafting a straight line between two given values of two different scales, making thus possible to determine the corresponding value on the third scale. For example (see line A in FIG. 2), if a PET having an IV of 0.82 dL/g is provided, and the sought final IV value is 0.80 dL/g, a maximum moisture content of 0.002% (or 20 ppm) must be reached after drying. These are typical values used to manufacture beverage bottles, for example sparkling water bottles requiring use of high-IV PET.

It may also be deduced from this chart that any trace of moisture present in the PET after drying will generate a drop in IV value. Only 0% moisture (which is in practice impossible) would avoid any drop in IV. This is why it is commonly accepted that the moisture content has to be reduced through drying to a maximum of about 0.003% in weight (30 ppm), and in any event less than 0.005% (50 ppm).

Loss of IV occurs mainly during plasticization of PET in the extruder. This loss is due to a reversible and/or non-reversible degradation of the PET (breaking of polymer chains).

Degradation is a chemical process which affects not only the chemical composition of the polymer but also the physical parameters such as the color of the polymer, its chain conformation, its molecular weight, its molecular weight distribution and its crystallinity.

The degradation has three origins: hydrolytic, thermo-oxidative, and thermal.

The thermal degradation is due to the overheating of the material during the injection process. It results in discoloration, chain scissions resulting in reduced molecular weight, formation of acetaldehyde and finally poor mechanical characteristics of the products.

The thermo-oxidative degradation is due to reaction with oxygen. It results in a degradation of the material causing a loss of IV, formation of acetaldehyde, discoloration and loss of mechanical properties.

The hydrolytic degradation is caused by the presence of water (moisture) in the material which leads to hydrolysis of the polymer. It results in reduction of the molecular weight (intrinsic viscosity reduction), loss of mechanical properties and formation of acetaldehyde.

However, at the same temperature, the impact of hydrolytic degradation is 5000 times greater than the impact of oxidative degradation and 10 000 greater than the impact of thermal degradation.

That is why the moisture content of PET after drying is the most important factor in IV drop.

The hydrolysis reaction leads to molecular chain scission at the ester bond. As the polymer chains are shortened, the molecular weight decreases such that the melt viscosity and intrinsic viscosity also drop. The content of carbonyl end groups (such as acetaldehyde; benzene and formaldehyde) increases.

However, the applicant has found that, despite the existing prejudice, a well-controlled hydrolytic degradation of PET during plasticization may be generated without resulting in unacceptable defects in the molded PET object.

Indeed, drying PET to a moisture content value above 50 ppm makes it possible to obtain PET having a low-IV (typically between 0.70 dL/g and 0.75 dL/g) from PET having a high-IV.

This may for example be advantageous because on some markets, low-IV PET is not very available and thus expensive, while high-IV PET is widely distributed and thus cheaper. Moreover, some industrial equipment is not compatible with high-IV PET injection.

Other advantages of a substantial but controlled IV drop will be explained below.

For example, starting from PET having an IV of 0.82 dL/g, a final IV of 0.74 dL/g may be obtained by drying PET to 0.010% of moisture (see line B in FIG. 2). 0.74 dL/g is sufficient for making bottles intended to contain still water, while PET having such a low IV is easier to mold, because it requires a lower pressure for injection molding, and has a more homogeneous distribution in the mold. It allows preforms to be manufactured having a wall thickness of less than 2 mm, making possible to obtain small lightweight thin-walled bottles after blow-molding, having typically a wall thickness of less than 200 micron, or even less than 100 micron.

Contrary to what is commonly thought, such a drop in IV may be generated without causing defects in the molded object, and without generating an unacceptable quantity of acetaldehyde. Standard injection molding parameters (injection pressure, injection velocity, etc.) may even be kept. This may be explained by the fact that the negative impact of hydrolysis is at least partially compensated by the positive impact of a greater fluidity of the material, a lower sheer and a possible lower injection temperature.

A controlled drop in IV during plasticization of the PET may typically be obtained by leaving a moisture content between 60 ppm and 250 ppm after drying, depending on the IV of the PET before drying and the sought final IV.

A third example is shown in FIG. 2. The line denoted C illustrates that, starting from a PET having an IV of 0.84 dL/g, a moisture content of 150 ppm leads to a final IV of 0.72 dL/g.

Figure 3:
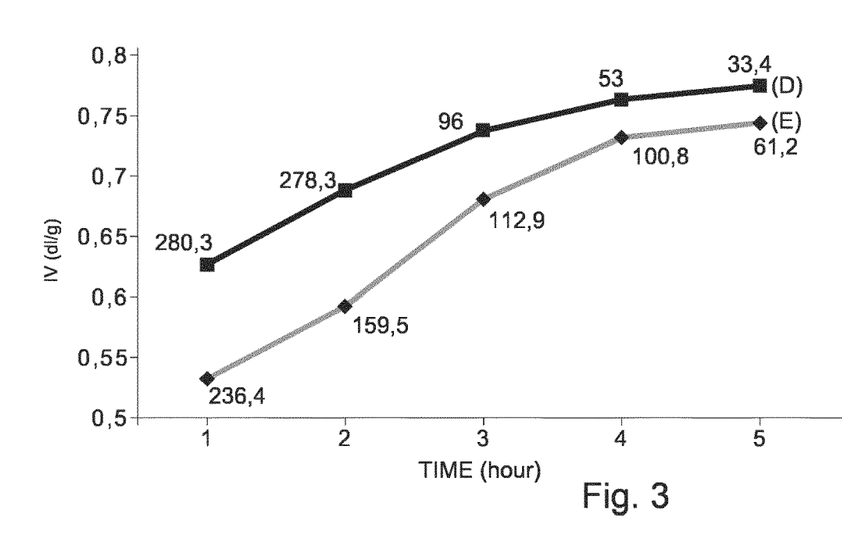
FIG. 3 schematically illustrates the influence on PET drying on the dew point of the air used for drying.
Figure 4:
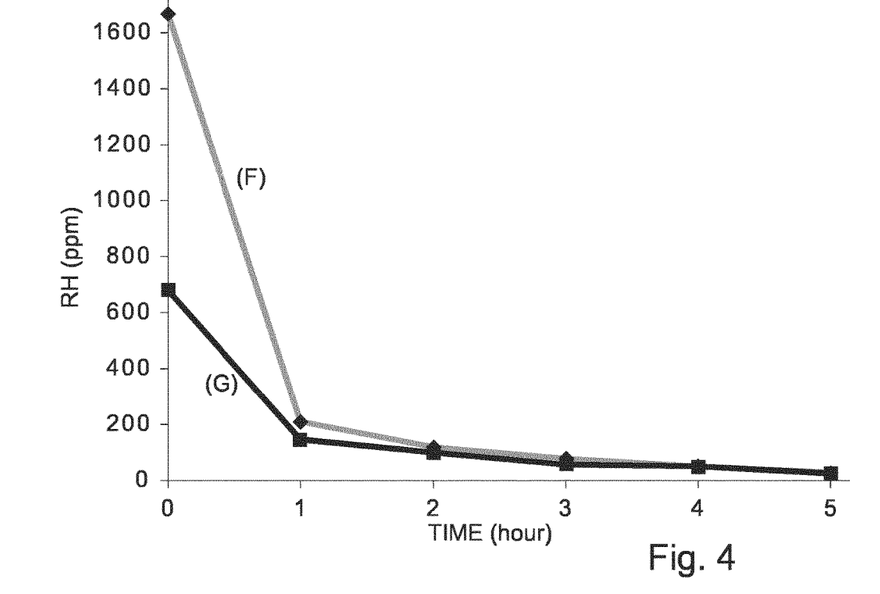
FIG. 4 schematically illustrates the influence of drying time on PET drying.
Figure 5:
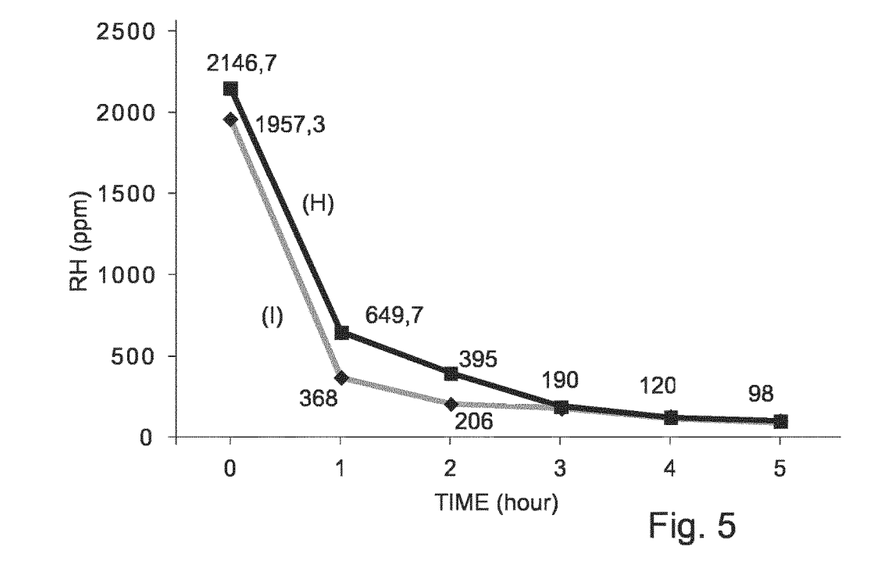
FIG. 5 shows a comparison between two PET drying processes using different parameters.

Many values of final IV may be so reached. FIGS. 3 to 5 illustrate how the drying parameters may be adapted to obtain a target moisture level.

FIG. 3 schematically illustrates the influence on PET drying of the dew point of the air used for drying. Drying time (or residence time of PET in the hopper) in hours is shown on the abscissa. The intrinsic viscosity in dL/g is shown on the ordinate.

Two curves are shown on the graph. Curve D corresponds to drying with air having a temperature of 170° C. and a dew point of −40° C. Curve E corresponds to drying with air having the same temperature of 170° C. and a dew point of −30° C. All other drying parameters are equal.

The moisture content or relative humidity is measured each hour. The value of relative humidity is written next to the corresponding measurement point.

The first measurement is performed after one hour of drying. It is known that during the first hour of drying, IV dramatically decreases before it rises again and then stabilizes at a value depending on the drying parameters (mainly air temperature and dew point). In a typical drying step corresponding to curve D, an air temperature of 170° C. and a dew point of −40° C. are used to obtain, after five hour of drying, a relative humidity of about 30 ppm (here 33.4 ppm). This value remains stable or decreases very slowly if the drying is continued after five hours.

Curve E illustrates PET drying under the same drying conditions, except that air having a dew point of −30° C. is used (which means that the air which is used for drying is slightly more humid than the air used for the drying step illustrated by curve D). In this example, with a dew point of −30° C. relative humidity of PET stabilizes at around 60 ppm (here 61.2 ppm after 5 hours of drying). As illustrated in FIG. 2, drying PET to 60 ppm of water may for example be used to make a material having an initial IV of 0.80 dL/g reach a final IV of 0.75 dL/g.

In addition to the previously mentioned advantages, using air having a higher dew point is economically pertinent, because the desiccant bed used to dry the air needs less regenerations.

FIG. 4 schematically illustrates the influence of drying time on PET drying. Drying time (or residence time of PET in hopper) in hours is shown on the abscissa. The relative humidity (RH) in ppm is shown on the ordinate. Curve F represents the change in the Relative Humidity of PET over five hours drying, starting from a relative humidity of 1667 pmm of water in PET. Curve G represents the change in the relative Humidity of PET over five hours drying, starting from a relative humidity of 680 pmm of water in PET. Both drying operations are performed under the same conditions (air temperature of 170° C. and dew point of −40° C.). This graph shows that four to five hours are necessary to obtain the same very low relative humidity of 25 ppm, regardless of the initial relative humidity. However, very similar relative humidity is obtained as of about two hours of drying. In the represented conditions, a relative humidity of about 100 ppm is obtained in two hours, regardless of the initial relative humidity. This shows that it is possible in the invention to shorten the drying time to get such a relative humidity, which will generate the expected loss in intrinsic viscosity. More generally, the drying time may be a parameter adapted to obtain the wanted relative humidity of PET. For example, a drying time limited to about two hours (this time being empirically finely adjusted) in conventional drying conditions may be used to obtain PET having a relative humidity of 100 ppm of water.

As illustrated on FIG. 2, drying PET to 100 ppm of water may for example be used to make a material having an initial IV of 0.82 dL/g reach a final IV of 0.74 dL/g. The applicant has found that, using a PET material having 100 ppm of water after drying does not (or almost not) impair the mechanical properties of the final product (after injection-molding and, if appropriate, blow-molding).

FIG. 5 shows a comparison between two PET drying processes using different parameters. Drying time (or residence time of PET in hopper) in hours is shown on the abscissa. The relative humidity (RH) in ppm is shown on the ordinate. Curve H represents the evolution of the Relative Humidity of PET over five hours drying, starting from a relative humidity of 2147 ppm of water, using drying air having a temperature of 140° C. and a dew point of −45° C. Curve I represents the evolution of the Relative Humidity of PET over five hours drying, starting from a relative humidity of 1957 ppm of water, using drying air having a temperature of 160° C. and a dew point of −25° C.

Air temperature and air dew point are the most important parameters for drying. However, after three hours drying the relative humidity of PET dried under relatively high temperature (e.g. 160° C.) and PET dried under a lower temperature but a very low dew point (e.g. −45° C.) is the same.

Producing hot air is energy consuming. Producing dry air requires an effective desiccant, which has to be periodically regenerated. In addition, in a general manner, the last degrees of temperature and the last percent of dryness are the most expensive to obtain. That is why, in addition to the advantages brought by the controlled loss of intrinsic viscosity obtained in the invention, using colder air compared to standard drying conditions (e.g. a temperature of 170° C. and a dew point of −40° C.) like in the example represented by curve H, and/or air having a higher dew point like in the example represented by curve I may be cost efficient.

It is however generally considered that a temperature of about 170° C. must be used, at least because a lower temperature could lead to difficulties in the extruder, which should require heating the PET again. However, the applicant has found that, in a process according to the invention, a drying temperature of 150° C. (and even slightly less) may be used with success. This arises from the fact that the loss of IV generated in the extruder compensates for the higher viscosity due to a lower temperature of PET.

The applicant has found that using a drying temperature a 150° C. and air having a dew point of −40° C. is a cost efficient compromise to obtain a relative humidity of PET around 100 ppm. Five hours drying may be used.

Figure 6:
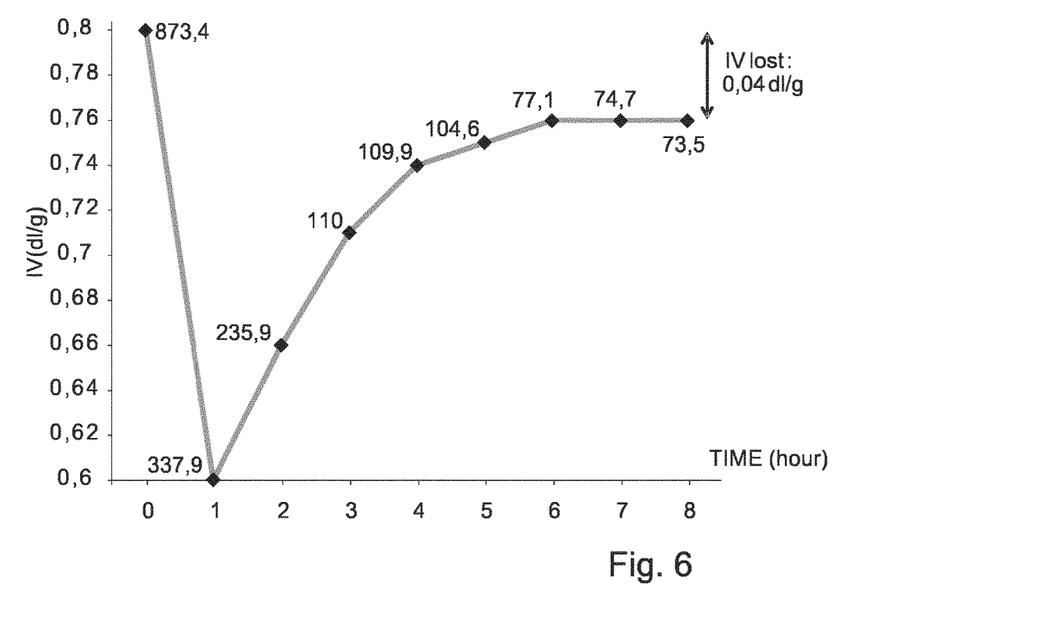
FIG. 6 schematically illustrates an example of fluctuation of IV during PET drying.

FIG. 6 schematically illustrates an example of fluctuation of IV during PET drying. Drying time (or residence time of PET in hopper) in hours is shown on the abscissa. The intrinsic viscosity in dL/g is shown on the ordinate. The moisture content or relative humidity is measured each hour. The value of relative humidity is written next to the corresponding point of measurement.

The graph shown in FIG. 6 corresponds to PET drying using air at 160° C. having a dew point of −40° C. This is slightly colder than the generally used temperature of 170° C. During the first hour of drying, the intrinsic viscosity drops drastically. During the following hours of drying, the intrinsic viscosity rises and stabilizes after 5 to 6 hours. This also corresponds to a stabilization of the moisture content in the PET. In the present example, the moisture content stabilizes around 74 ppm, causing an IV loss of 0.04 dL/g (which is much more than the maximum of 0.01 to 0.02 dL/g commonly accepted).

This may for example be used to make PET having an initial IV of 0.80 dL/g reach a final IV of 0.76 dL/g.

Figure 7:
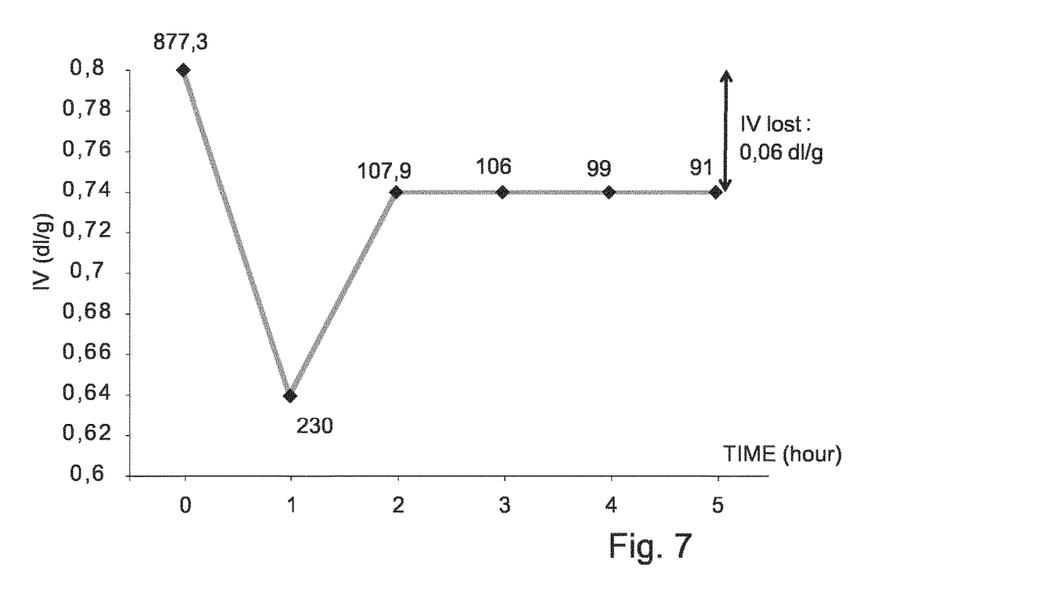
FIG. 7 schematically illustrates another example of fluctuation of IV during PET drying.

FIG. 7 schematically illustrates an example of fluctuation of IV during PET drying. Drying time (or residence time of PET in the hopper) in hours is shown on the abscissa. The intrinsic viscosity in dL/g is shown on the ordinate. The moisture content or relative humidity is measured each hour. The value of relative humidity is written next to the corresponding point of measurement.

The graph shown in FIG. 7 corresponds to PET drying using air at 150° C. having a dew point of −40° C. This is colder than the generally used temperature of 170° C. During the first hour of drying, the intrinsic viscosity drops drastically. During the following hours of drying, the intrinsic viscosity rises and stabilizes after about 2 hours. This also corresponds to a stabilization of the moisture content in the PET. In the present example, the moisture content stabilizes around 100 ppm, causing an IV loss of 0.06 dL/g (which is much more than the maximum of 0.01 to 0.02 dL/g commonly accepted).

This may for example be used to make PET having an initial IV of 0.80 dL/g reach a final IV of 0.74 dL/g.

Figure 8:
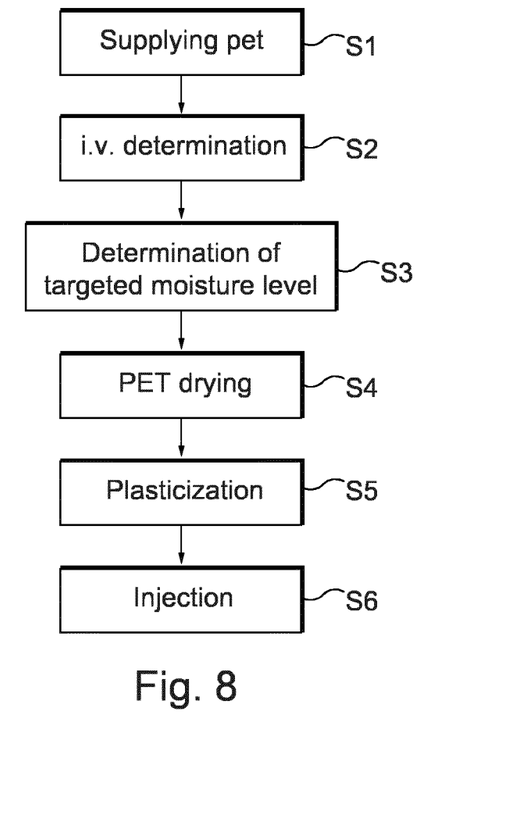
FIG. 8 is a block diagram representing a process according to an embodiment of the invention.

FIG. 8 is a block diagram representing a process according to an embodiment of the invention. In the represented embodiment, PET raw material is supplied in a first step S1. PET is commonly supplied in the form of PET chips which are water-saturated. The intrinsic viscosity of the supplied PET material is known, or determined in an IV determining step S2.

Next, a target moisture level is determined in a third step S3. The target moisture level is preferably based on the intrinsic viscosity of the supplied PET raw material, determined at the determining step S2 of the represented embodiment of the invention, and a targeted intrinsic viscosity of the PET after plasticization. Typically, the target moisture level is between 60 ppm and 250 ppm.

The PET chips are then dried during a drying step S4. After the drying step, the PET material has reached the target moisture level determined at the third step S3.

The dried PET is then placed in an extruder in which it is plasticized in a plasticization step S5. During the plasticization step S5, hydrolysis of PET occurs, leading to a drop of intrinsic viscosity, dependent on the moisture level of the PET after the drying step S3.

Next, in an injection step S6, the plasticized PET is injected into a mold. For example, a preform may be injection molded, the preform being configured for obtaining a bottle by blow-molding.

By generating a controlled IV loss, which is avoided at all costs in the common practice, the invention makes it possible to use cheap high-IV PET even when such high IV is not necessary (for example for making still water bottles). Lower cost compared to the standard processing of high-IV PET is obtained by the use of drying air being colder and/or having a higher dew point than drying air generally used for drying PET. PET residence time in the drying hopper may also be shortened. Relatively old injection-molding devices (comprising an extruder and a mold) may be used without modification or update. The invention thus makes it possible to reduce the costs for providing energy all along the manufacturing process of a container such as a bottle, and makes it possible to reduce the costs related to the used material, while maintaining the physical properties of the obtained container.

A controlled loss of IV of the PET may also facilitate obtaining preforms having a small wall thickness such as less than 2 mm. Such a preform is needed to obtain a lightweight thin-walled bottle, having walls having a thickness of less than 200 microns and preferably less than 100 microns, e.g. between 50 microns and 100 microns. Such a thickness is preferably present for the majority of the bottle walls, i.e. more than 50 percent of the surface of the bottle.

Although the invention has been described by way of example, it should be appreciated that variations and modifications may be made without departing from the scope of the invention as defined in the claims. Furthermore, where known equivalents to specific features exist, such equivalents are incorporated as if specifically referred in this specification.

The invention claimed is:

1. A method for processing polyethylene terephthalate (PET), the method comprising:
   supplying a PET raw material;
   determining a target moisture level based on an intrinsic viscosity of the supplied PET raw material and a targeted intrinsic viscosity of the PET raw material after plasticization;
   drying the PET raw material to the target moisture level;
   plasticizing the PET raw material; and
   injecting the plasticized PET into a mold,
   wherein the target moisture level is between 60 ppm and 250 ppm to generate a hydrolysis of the PET raw material during plasticization resulting in a controlled drop of the intrinsic viscosity of the PET raw material during plasticization.

2. The method according to claim 1, wherein the targeted intrinsic viscosity is set between 0.70 dL/g and 0.76 dL/g.

3. The method according to claim 1, wherein the supplied raw material has an intrinsic viscosity of between 0.80 dL/g and 0.85 dL/g.

4. The method according to claim 1, wherein the drying is performed at 150° C. or below.

5. The method according to claim 1, wherein the drying is performed using drying air having a dew point of −40° C. or higher.

6. The method according to claim 1, wherein the drying is performed using a residence time of the PET raw material in a dryer of between one and four hours.

7. The method according to claim 1, wherein the plasticized PET raw material is injection-molded to form a container preform for a container.

8. The method according to claim 7, wherein the container is a bottle.

9. Method A method for forming a bottle comprising using polyethylene terephthalate (PET), the method comprising:
   supplying a PET raw material;
   drying the PET raw material to a target moisture level;
   plasticizing the PET raw material;
   injecting the plasticized PET raw material into a mold,
   the target moisture level is between 60 ppm and 250 ppm to generate a hydrolysis of PET raw material during plasticization of the PET raw material resulting in a controlled drop of an intrinsic viscosity of the PET raw material to provide a preform of a bottle; and
   producing the bottle using blow molding, wherein the bottle has a wall thickness of less than 100 microns over at least 50 percent of a surface of the bottle.

10. The method according to claim 9 comprising filling the bottle with a still beverage.

11. The method according to claim 1, wherein the drying is performed using a residence time of the PET raw material in a dryer of between one and three hours.

* * * * *